Sept. 21, 1965

E. T. LONG 3,206,820

LANYARD OPERATED LATCH

Filed March 12, 1964

INVENTOR.
ERNEST T. LONG

BY

*P. H. Firsht*

ATTORNEY.

United States Patent Office 3,206,820
Patented Sept. 21, 1965

3,206,820
LANYARD OPERATED LATCH
Ernest T. Long, China Lake, Calif., assignor to the United States of America as represented by the Secretary of the Navy
Filed Mar. 12, 1964, Ser. No. 351,571
12 Claims. (Cl. 24—230)

The invention described herein may be manufactured and used by or for the Government of the United States of America for governmental purposes without the payment of any royalties thereon or therefor.

The present invention relates to a releasable retaining means for arming a free-fall ordnance or pyrotechnic item or for initiating some action; and more particularly, to a lanyard operated latch which is released by a pull thereon from substantially any direction.

To accomplish necessary release of such retaining means, prior art devices often make use of a cotter pin or the like attached to a lanyard or the like; for example, note pin 53 and chain 54 in U.S. Patent No. 2,442,374, issued June 1, 1948, to B. Nogueira. However, such devices have the disadvantage that the direction of pull must be correct for proper functioning; otherwise the pin is bent or broken off and release of the retained means is not effected. Such performance is undesirable; especially, where the free-fall ordnance items or other devices are dropped from the carrying aircraft in a pattern for a purpose. This is particularly true in the case of pyrotechnic devices dropped in a cloud-seeding operation in which proper initiation of such devices is essential to effect the intended purpose.

The present invention overcomes the disadvantages of the aforementioned prior art devices by providing a retainer of a deformable material in the form of a soft metal disk notched at opposite points and held in place at these points by a screw and a positioning element, and a lanyard attached to the disk and adapted by a pull from substantially any direction to release the retainer.

It is therefore an object of the invention to provide a simple, inexpensive, readily releasable retainer which has high performance reliability.

Another object is the provision of a releasable retaining means adapted to be readily released by a pull from substantially any direction and which performs reliably.

Other objects, advantages and novel features of the invention will become apparent from the following detailed description of the invention when considered in conjunction with the accompanying drawings wherein.

Figure 1:
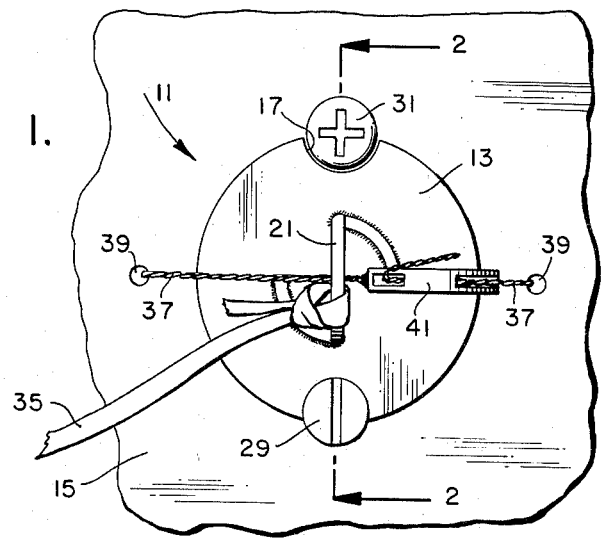
FIG. 1 is a plan view of the latch of the present invention.
Figure 3:
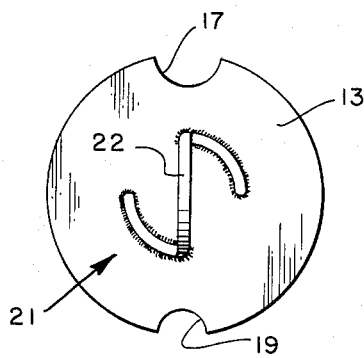
FIG. 3 is a plan view of the metal disk.

Referring now to the drawings, wherein like reference characters designate like or corresponding parts throughout the several views, there is shown in FIG. 1 an embodiment of the latch of the present invention designated generally by numeral 11 and comprising a disk 13 secured to a housing 15, shown in part. The disk 13 may be made of a deformable material, for example, a soft metal such as aluminum, copper, gold, lead, silver, tin, zinc or the like, or even a plastic or thin ductile steel, and is formed with a pair of diametrically opposite notches 17 and 19 (FIG. 3). The disk 13 is also provided with an attaching means 21 which may take the form of an inverted U-shaped member 22 secured to the central portion of the disk, in alignment with the notches, as by brazing, welding, soldering or the like in the case of metals, or by a suitable bonding agent in the case of a plastic. Alternatively, the U-shaped member 22 may have the ends thereof pass through disk 13 and be suitably secured to the other side thereof, or the disk may be provided with a pair of parallel slits and the material between the slits pressed out to form an attaching loop comparable to member 22.

Figure 2:
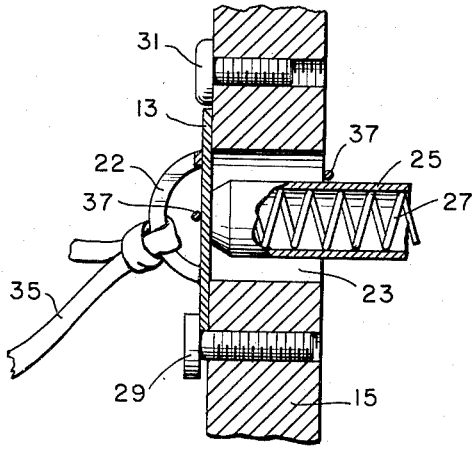
FIG. 2 is a sectional side view of the latch taken generally along lines 2—2 of FIG. 1.
Figure 4:
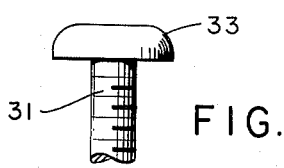
FIG. 4 is a side view, on an enlarged scale, of the head of the positioning element.

As can be seen in FIG. 2, disk 13 is located over an opening 23 in housing 15 within which is disposed the free end of a biased element 25 suitably mounted for longitudinal movement and biased outwardly by spring 27. Element 25 is suitably connected to means which, when moved by outward movement of the element, condition or initiate some action in an ordnance or pyrotechnic item or the like, as by closing and/or opening switches or withdrawing a locking member. Disk 13 is secured in position to retain element 25 inoperative by a screw 29 threadedly connected to housing 15, the stem of the screw being disposed in notch 19 with the screw head disposed over the edges of the notch and in tight engagement therewith. Notch 17 is purposely made larger than notch 19 in order to receive within itself the head of a positioning element 31 which may take the form of a screw or rivet suitably connected to the housing 15. While the head of screw 29 may be flat or round, as desired, the head of element 31 must be rounded as at 33 (FIG. 4) in order that it may perform a camming function in response to a side pull exerted upon the disk through the medium of a length of nylon pull cord or tape 35 knotted to the attaching means 21.

To prevent accidental or inadvertent displacement of the disk 13, use may be made of a safety wire 37 of the soft strand type, the wire being passed through apertures 39 in housing 15, attaching means 21 and a conventional lead seal 41. The lead seal serves not only to hold the wire tight after it has been drawn up but also to indicate any tampering with the latch.

In operation, a latch of the type hereinbefore described is affixed to each of the items to be initiated, with the intermediate portion of the pull cord or tape 35 folded into a bundle of loops and lightly taped to the item. The items are then attached to the launching racks on the carrying aircraft and the ends of the pull cords are tied to fixed points on the the aricraft. The aircraft is readied for flight and the safety wires 37 are cut and the ends thereof bent away from the respective disks 13. After arrival at the launching points, the items are released in desired order. As each item drops away, the bundle of loops is released, the pull cord or tape is stretched out its full length, and a strong pull is exerted upon the disk. Should the pull of the cord or tape be directly away from the disk, or substantially so, the disk will be pulled away from its positioning element 31 and will bend in the vicinity of screw 29, finally pulling out from under the head of the screw. In the case where the pull is more to the side, the disk will tend to turn about screw 29 as a pivot with the result that a side edge of notch 17 will be brought into engagement with and cammed outwardly by the rounded head 33 of positioning element 31, thus permitting continued turning of the disk and a pulling away thereof from under the head of screw 29. Even should the disk tear or break in the vicinity of screw 29, the major portion of the disk will be pulled away and release of the biased element 25 effected.

Many field and operational tests have proved the latch to be highly reliable in performance regardless of the direction of pull upon the disk.

There has thus been provided a latch in the form of a simple, inexpensive retaining means so secured as to be readily releasable by a pull thereon from substantially any direction and which has high degree of performance reliability.

While the latch of this invention has been described in connection with ordnance items and pyrotechnic devices, it will be appreciated that it is capable of use wherever a readily releasable retainer is needed. For example, it could be employed in an alarm system in which case trip lines would be connected to the disk.

Obviously, many modifications and variations of the present invention are possible in the light of the above teachings. It is therefore to be understood that within the scope of the appended claims the invention may be practiced otherwise than as specifically described.

What is claimed is:

1. Means for releasably retaining a biased element comprising, in combination:
   a housing having an opening therein;
   means movably mounted in said housing and biased for movement outwardly thereof through said opening;
   retaining means of deformable material secured to said housing and covering said opening; and
   attaching means secured to said retaining means adapted to have pull means attached thereto.

2. The combination of claim 1, wherein said retaining means comprises a generally planar piece of soft metal.

3. The combination of claim 2, wherein said attaching means comprises a U-shaped element rigidly fixed to said retaining means.

4. The combination of claim 3, wherein said piece of soft metal is held in place at two points oppositely located on the periphery thereof in general alignment with said element.

5. The combination of claim 1, wherein said retaining means comprises a disk of soft metal held in place at two substantially diametrical points, and said attaching means is fixed thereto at the central portion thereof in general alignment with said points.

6. Readily releasable means for initiating an action, comprising, in combination:
   an element biased to move in one direction;
   a disk-like piece of deformable material disposed across the path of said element and retaining the same in biased condition;
   diametrically-disposed holding means engaging said material at the periphery thereof for holding the same in retaining position; and
   attaching means secured to said material at the central portion thereof adapted to have pull means attached thereto.

7. The combination of claim 6, wherein said material has a notch at one edge thereof and one of said holding means is disposed within said notch, the other holding means having a portion extending over the edge of the material.

8. The combination of claim 7, wherein said material comprises a soft metal.

9. An article of manufacture, comprising:
   a thin disk-like piece of deformable material having diametrically-opposite notches formed in the peripheral edge thereof; and
   a U-shaped attaching element at the central portion thereof in alignment with said notches.

10. The article of claim 9, wherein said material comprises a soft metal.

11. The article of claim 9, wherein said material comprises a metal from the group consisting of aluminum, copper, gold, lead, silver, tin and zinc.

12. The article of claim 9, wherein said material comprises thin ductile steel.

References Cited by the Examiner

UNITED STATES PATENTS

| | | | |
|---|---|---|---|
| 1,962,317 | 6/34 | Mangin | 220—27 |
| 3,141,215 | 7/64 | Turolla | 24—201 |

WILLIAM FELDMAN, *Primary Examiner.*

BERNARD A. GELAK, *Examiner.*